United States Patent Office 2,914,171
Patented Nov. 24, 1959

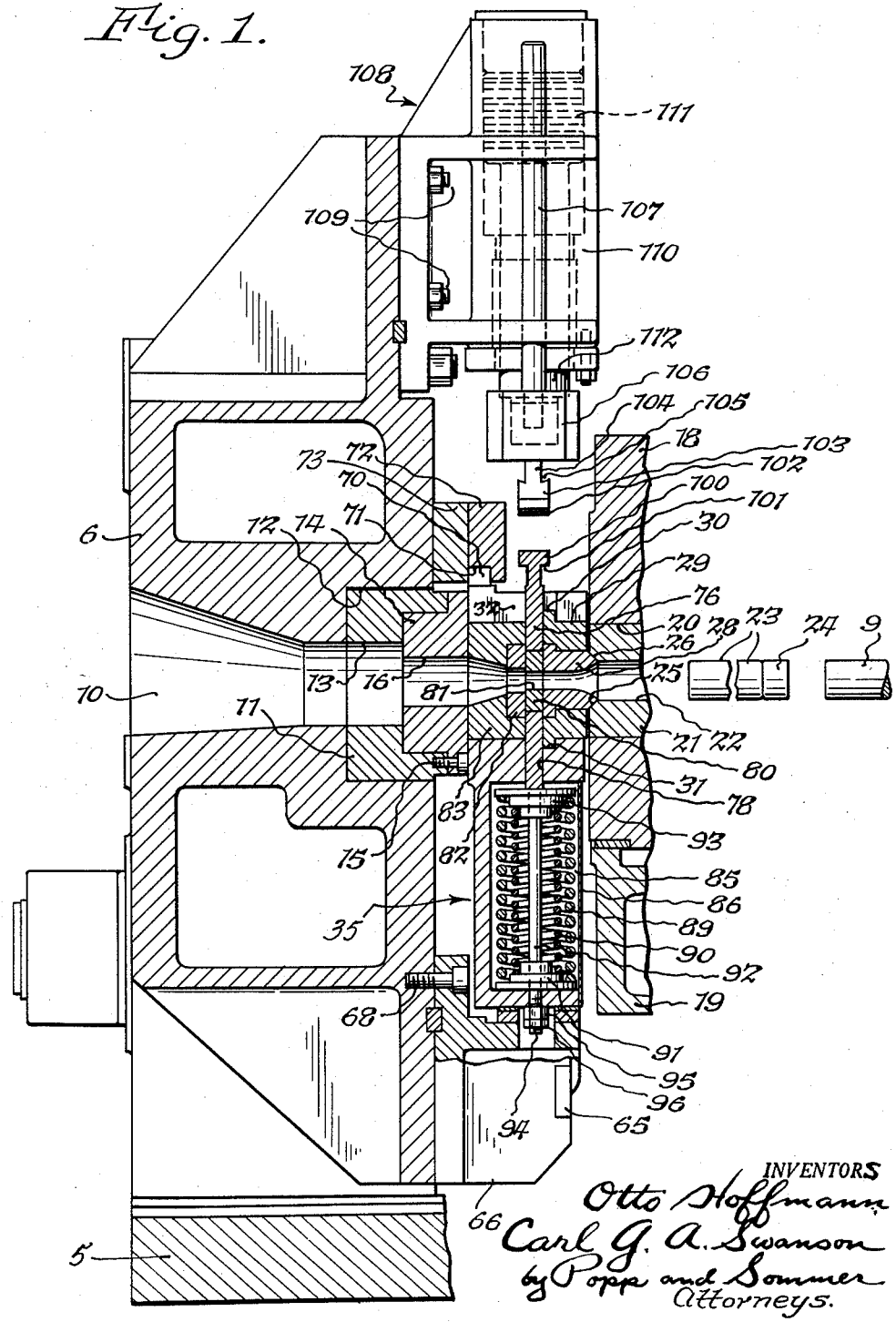

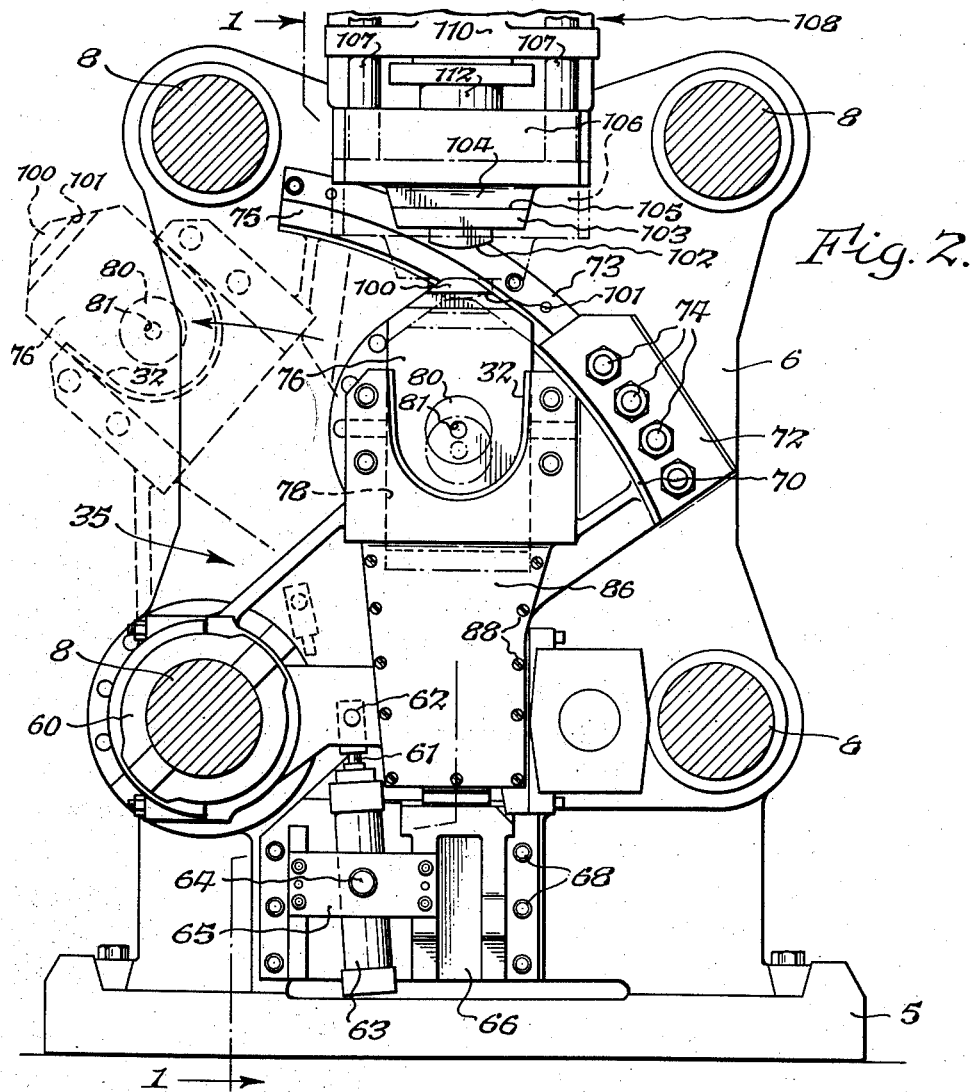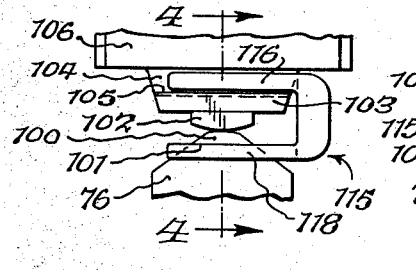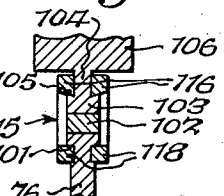

2,914,171

EXTRUSION PRESS

Otto Hoffmann and Carl G. A. Swanson, Kenmore, N.Y., assignors, by mesne assignments, to Lake Erie Machinery Corporation, Buffalo, N.Y., a corporation of New York Application May 2, 1955, Serial No. 505,472

4 Claims. (Cl. 207—2)

This invention relates to an extrusion press and more particularly to a heavy duty horizontal hydraulic press for extruding metal shapes from hot billets.

One of the principal objects of the present invention is to increase the speed of operation of such a heavy duty metal extrusion press, particularly in cutting the enlarged discard end from the extrusion so that the severed extrusion can be carried away and the discard end and die removed from rapid replacement by another die.

Another object is to provide a simple, effective and rapid device for severing the enlarged discard end from the extrusion, this being in the form of a simple shear blade.

Another object is to provide such a press in which there is a minimum amount of time lost on encountering operational difficulties, such as the shear blade failing to be returned to its normal position after severing the enlarged discard end.

Another object is to provide such a device for severing the enlarged discard end which is in the form of a compact but strong and powerful unit and which will stand up under conditions of severe and constant use without getting out of order or requiring repair.

Other objects and advantages of the invention will be apparent from the following description and drawings in which:

Fig. 1 is a fragmentary vertical section through a heavy duty metal extrusion press embodying the present invention and taken generally on line 1—1, Fig. 2.

Fig. 2 is an enlarged vertical cross section through the extrusion press.

Fig. 3 is a fragmentary side elevational view of the upper part of the shear blade 76 and showing the manner in which a C-shaped yoke or coupling can be employed to positively release the shear blade in the event that it becomes jammed.

Fig. 4 is a fragmentary vertical section taken on line 4—4, Fig. 3.

The extrusion press forming the subject of the present invention generally follows the extrusion press forming the subject of the copending Thweatt and Swanson application, Serial No. 242,382, filed August 17, 1951, now Patent No. 2,728,453, dated December 27, 1955, and reference is made to this prior application for a more detailed showing of the features of the extrusion press not immediately concerned with the subject of the present invention.

The extrusion press as shown both in the present and in the said Thweatt and Swanson application is mounted on a bed 5 and the main section of the press comprises a stationary die platen 6 and a stationary cylinder platen (not shown) these stationary platens being securely held together at the four corners thereof by four large horizontal columns 8. The cylinder platen supports the usual main ram of which only the main plunger 9 is shown.

As best shown in Fig. 1 the stationary die platen 6 is provided with a large through opening 10 in line with the main plunger 9 and through which the extrusion passes. A large rear backup block 11 is set into a recess 12 in the rear face of the die platen 6 and is provided with a through opening 13 through which the extrusion passes and which registers with the opening 10 in the die platen 6. This backup block can be secured to the die platen in any suitable manner and is shown as carrying a smaller backup block 14 secured by screws 15 and also having an opening 16 through which the extrusion passes.

A billet container holder 18 is mounted on a crosshead 19 and which crosshead is mounted in any suitable manner (not shown) for sliding movement lengthwise of the plunger 9. This billet container holder 18 has a through bore 20 in which a billet container 21 is fixed. This billet container 21 has a through bore 22 which is axially in line with the plunger 9 and which is adapted to receive the billet 23, its dummy block 24 and also the main plunger 9. The billet container 21 has an enlarged bevel 25 at the rim of its bore 22 facing the die platen 6 and which receives the beveled nose 26 of a die 28. This die is carried by a cylindrical die holder 29, this die holder having at its end adjacent the die platen 6 a concentric outwardly projecting annular flange 30 fitted in a U-shaped slot 31 at the center of a U-shaped jaw or recess 32 formed in the free end of a swinging arm or die transfer means indicated generally at 35.

This swinging arm is journalled by a bearing 60 on one of the lower horizontal columns 8 of the main section of the extrusion press and is swung about the axis of this column by a piston rod 61 pivoted to the swinging arm 35 at 62, the piston rod being fast to a piston contained within a hydraulic cylinder 63. This cylinder is shown as pivoted at its center at 64 to a base plate 65, this base plate being secured at its ends to a base bracket 66. This base bracket is shown as secured by screws 68 to the stationary die platen 6.

The outer extremity of the swinging arm 35 is shown as provided with a radially projecting arcuate guide flange 70, the curvature of which is concentric with the axis of rotation of the swinging arm 35 and this arcuate flange moving along an arcuate groove 71 provided in a guide block 72. This guide block 72 is secured to the stationary die platen 6 and is secured against an arcuate guide piece 73 by stud screws 74. This arcuate guide piece 73 has an arcuate slideway 75 which continuously engages that side of the guide flange 70 which opposes the die platen 6.

A feature of the present invention resides in the provision of a shear blade 76 for cutting off the enlarged discard end from the extrusion. This shear blade is in the form of a slide and is mounted in a slideway 78 in the swinging arm and moves vertically when the swinging arm 35 is in operative position, that is, with the die holder 29 and die 28 in the swinging arm alined with the main plunger 9. The shear blade or slide 76 has a central opening in which a removable cutting member 80 is arranged, this cutting member having an opening 81 through which the extrusion from the die 28 passes. This cutting member of the shear blade is backed by a small backup block 82 contained within a larger backup block 83, the latter being contained within the jaw 32 of the swinging arm 35 and being in turn backed by the backup blocks 14 and 11 of the die platen 6.

The slideway 78 leads to a spring chamber 85 provided in the swinging arm 35 by recessing the side of this arm which faces the main plunger 9. This spring chamber 85 is closed by a face plate 86 secured by screws 88 and contains a pair of helical compression springs 89 and 90, the common axis of which is coincident with the line of movement of the center of the shear blade 76. The springs 89, 90 seat upon a stepped annular foot member 91 through which a rod 92 slidingly extends, this rod having a stepped head 93 at its upper end which engages the opposite ends of the helical compression springs 89 and 90. The rod 92 slidingly projects through the wall of the swinging arm 35 and its projecting end is threaded, as indicated at 94, to receive an adjusting nut 95 and a lock nut 96. The rod 92 is capable of lengthwise movement from the position shown in Fig. 1, but the helical compression springs 89 and 90 are held at all times under compression the degree of which is determined by the adjustment of the nut 95 which determines the maximum distance between the stepped head 93 and stepped foot 91. The stepped head 93 of the rod 92 supports the lower end of the shear blade 76.

The upper end of this shear blade 76 is formed to provide an enlarged anvil head 100, this enlarged head providing a pair of undercuts or downwardly facing grooves 101 at its opposite sides. The top of this head 100 is engaged by the striker plate 102 on the bottom of an enlarged hammer head 103 at the bottom of a neck 104 which neck provides a pair of upwardly facing grooves 105 on opposite sides of the enlarged head 103. These grooves 105 are parallel with the undercut grooves 101 of the head 100 of the shear blade 76.

The neck 104 is fixed to and projects downwardly from a crosshead 106 having upwardly projecting guide pins 107 at its opposite ends, which are guided in a bracket 108 secured by stud screws 109 to the fixed die platen 6. This bracket 108 also carries a vertical cylinder 110 housing a piston 111, the piston rod 112 of which is fixed to the crosshead 106. The axis of the cylinder 110 and its piston rod 112 is in vertical alinement with the horizontal axis of the die 28 and main plunger 9.

The numeral 115 represents a C-shaped coupling member having an upper bifurcated jaw 116 which straddles the neck 104 of the enlarged head 103 and seats in the grooves 105 formed by this head. This C-shaped yoke or coupling member also has a lower bifurcated jaw 118 which seats in the undercut grooves 101 formed by the enlarged head 100 of the shear blade 76. The purpose of the coupler or yoke 115 is to permit of positively pulling up the shear blade 76 by the piston 111 if this shear blade should become stuck in a depressed position.

*Operation*

A succession of die assemblies, each comprising a die 28 and its die holder 29 are used in the extrusion of the metal shapes, it being necessary to cool and clean each die assembly following each extrusion. In extracting the used die assembly and replacing it with a cleaned and cool fresh die assembly, the main plunger 9 has been retracted and the billet container 21 has been moved out of engagement with the tapering nose of the die 28, this having been done by moving the cross head 19 horizontally away from the die platen 6.

With the parts in this position, the swinging arm 35 is capable of swinging on its bearing 60 around the lower left horizontal column 8 as viewed in Fig. 2 from the full line operative position of this arm as shown in this figure to the dotted line loading and unloading position of this arm as shown in this same figure. Movement of the swinging arm 35 to the dotted line loading and unloading position shown in Fig. 2 is effected by introducing fluid under pressure into the bottom of the cylinder 63. This forces the piston rod 61 upwardly thereby to swing the swinging arm 35 counterclockwise and to move its slotted jaw 32 from the vertical operative position shown by full lines in Fig. 2 to the angular position shown by dotted lines in this figure. In this latter position, the die assembly 28, 29 is at one side of the machine and at a convenient angle to be pulled out of the end jaw 32 of the swinging arm 35, which is done. It is then replaced with a fresh die assembly 28, 29, the annular flange 30 of the fresh die holder 29 being slipped into the groove 31 of the jaw 32 of the swinging arm 35 so that this die holder 29 and its die 28 assume the position at the bottom of the jaw 32 as shown in Fig. 1 and with its flange 30 disposed against the shear blade 76.

After a fresh die assembly has been so placed in the swinging arm 35, fluid pressure is then applied to the upper end of the cylinder 63 which forces its piston rod 61 downwardly thereby to swing the swinging arm 35 to the full line position shown in this figure. In this position, the die 28 is in axial alinement with the main plunger 9 and in position to produce an extruded form from the billet 23.

Contemporaneously, with so loading a fresh die assembly into the swinging arm 35, a billet 23 is also brought into line with the bore 22 of the billet container 21 by a billet loader (not shown) which can also insert the billet 23 and its dummy block 24 into the bore 22 of the billet container 21. During this billet loading, the billet container 21 can also be moved forwardly into engagement with the beveled nose of the die 28. This movement of the billet container 21 is effected by movement of the cross head 19 toward the die platen 6, this cross head carrying with it the billet container holder 18 and billet container 21. This position of the parts is illustrated in Fig. 1.

Following this, full pressure is appied to the main ram to drive its plunger 9 toward the die platen 6. This plunger moves through the bore 22 of the billet container 21 and exerts extrusion pressure against the dummy block 24 at the rear end of the billet 23 so as to force the opposite end of the billet through the die opening of the die 28. The pressure against the die 28 in forming the extrusion is transmitted by the cutting member 80 and series of backup blocks 82, 83, 14 and 11 to the stationary die platen 6.

In this movement, the main plunger 9 moves the dummy block 24 to a position short of the tapered nose of the die 28 at which time the movement of the plunger 9 is stopped so that a discard or enlargement is left at the end of the extrusion produced by the press. This discard or enlargement is contained within the extremity of the billet container 21 at the die 28 and this discard includes that portion of the metal remaining between the dummy block and die opening and hence not extruded from the outlet end of the die 28. It is necessary to sever this enlarged discard end from the extrusion before the extrusion can be removed from the extrusion press through the opening 10 of the die platen 6.

To sever the discard, fluid under pressure is introduced into the upper end of the cylinder 110 which forces the piston 111 and piston rod 112 downwardly. This forces downwardly the crosshead 106 and, through the neck 104 projecting downwardly from this cross head, forces the head 103 and striker plate 102 downwardly until the striker plate engages and forces downwardly the head 100 at the upper end of the shear blade 76. This forces this shear blade or slide 76 downwardly thereby to move the cutting member 80 across the extrusion and to sever the discard from the extrusion. This downward movement of the shear blade 76 in its guideway 78 forces downwardly the stepped head 93 at the upper end of the rod 92 thereby to further compress the helical springs 89 and 90. The rod 92 slides downwardly through the bottom stepped foot 91 and the wall of the swinging arm 35 to permit such downward movement of the shear blade 76 in severing the discard.

After the discard has been severed, the extrusion can be removed through the opening 10 in the die platen 6 and fluid under pressure is introduced into the lower end of the cylinder 110 so as to raise the head 103 and striker plate 102 from engagement with the head 100 at the upper end of the shear blade 76. When this occurs, the helical compression springs 89 and 90 move the stepped head 93 and rod 92 upwardly until the nut 95 is brought against the exterior of the arm 35. This upward movement of the stepped head 93 serves to move the shear blade 76 upwardly and the adjustment of the nut 95 is such that the shear blade 76 is brought to the position shown in Fig. 1, that is, with the hole through its cutting member 80 in alinement with the opening through the die 28.

If, for any reason, the cutting blade 76 should be stuck in its downward position, fluid under pressure is again introduced into the top of the cylinder 110 so as to move the head 103 and the striker plate 102 into engagement with the head 100 at the upper end of the shear blade 76. The operator of the press then takes the C-shaped coupler or yoke 115 shown in Fig. 4 and moves it horizontally with its upper bifurcated jaw 116 passing along the grooves 105 formed on opposite sides of the neck 104 for the head 103 and with its lower bifurcated jaw 110 passing along the undercut grooves 101 at opposite sides of the head 100 of the shear blade 76. Upon now introducing fluid under pressure into the lower part of the cylinder 110, the shear blade 76, through the C-shaped yoke 115 is positively pulled up by the head 103.

The operator can then move the crosshead 19 and plunger 9 away from the die platen 6 and thereby (1) withdraw the discard end from the opening in the die 28 and (2) separate the mating beveled faces of the die 28 and billet container 21. This discard end, together with the dummy block 24, can then be ejected from the bore 22 by relative movement of the main plunger 9 and billet container 21 so that the discard is forced into the space between the swinging arm 35 and the billet container assembly 18, 19 and 21. The discard and dummy block 24 can fall downwardly through this space or can be removed in the manner disclosed in the said Thweatt and Swanson application.

Following this, fluid under pressure is supplied to the lower end of the cylinder 63 so as to drive the piston rod 61 upwardly and thereby rotate the swinging arm 35 counterclockwise as viewed in Fig. 2 to the dotted line position shown in this figure. In this position, the end jaw 32 of the swinging arm 35 is brought to the side of the extrusion press and the hot die assembly 28, 29 can be removed from this jaw 32 at which time the small cylinder of metal contained within the cutting member 80 of the shear blade 76 can also be removed. A fresh die assembly 28, 29 can thereupon be replaced in the slotted end jaw 32 of the swinging arm 35 to repeat the cycle as previously described.

From the foregoing, it will be seen that the present invention provides a very simple, rugged and positively acting shear for rapidly severing the enlarged discard end of an extrusion thereby to increase the overall speed and capacity of heavy duty extrusion presses.

We claim:

1. A metal extrusion press, comprising a die holder, a die in said die holder, a die platen provided with a first opening through which the extrusion is projected, a main plunger projectable toward said first opening from one side thereof, means providing a slideway on the face of said die platen opposing said main plunger, die transfer means slidingly guided by said slideway and having a through opening arranged to aline with said first opening and plunger, said die transfer means being provided at the end of its said through opening opposing said plunger with a pocket removably supporting said die holder and die, means arranged to confine a billet against said die for extrusion through the die by said plunger, means providing a straight slideway in said die transfer means across said through opening therein and arranged adjacent to and across the outlet side of the die in said die holder, a blade slidably mounted in said straight slideway and having a cutting edge arranged to cross between said first opening and plunger, an anvil head fast to one end of said blade, spring means on said die transfer means biasing said blade in the direction to project said anvil head and to maintain said cutting blade in an inoperative position with its cutting edge in position to operatively cross between said first opening and plunger, a hammer head mounted on said die platen for movement into hammering engagement with said anvil head when said die transfer means are in operative position with its die in alinement with said first opening and plunger, and means for moving said hammer head into and out of engagement with said anvil head whereby the extrusion from said die can be severed by said cutting edge immediately following its extrusion, while still hot, close to the outlet side of the die, and by one or more hammer blows from said hammer head.

2. A metal extrusion press as set forth in claim 1 wherein said cutting edge is in the form of a hole in said cutting blade completely surrounded by the mateerial of the cutting blade, and wherein said spring means maintains said hole in alinement with said first opening and plunger in so maintaining said cutting blade in said inoperative position.

3. A metal extrusion press as set forth in claim 1 additionally including means on said hammer head and anvil head adapted to receive a removable coupling member to couple said hammer and anvil heads together and permit said hammer head to withdraw said cutter blade when stuck.

4. A metal extrusion press as set forth in claim 1 wherein said die transfer means is in the form of a swinging arm pivoted to said die platen to swing about an axis generally parallel with said main plunger.

References Cited in the file of this patent

UNITED STATES PATENTS

| 1,317,238 | Summey | Sept. 30, 1919 |
| 1,947,202 | Homeier | Feb. 13, 1934 |
| 2,539,564 | Barrett | Jan. 30, 1951 |
| 2,643,403 | MacBlane et al. | June 30, 1953 |
| 2,728,453 | Thweatt et al. | Dec. 27, 1955 |
| 2,753,043 | Poleschuk | July 3, 1956 |

FOREIGN PATENTS

| 405,879 | Great Britain | Feb. 15, 1934 |